United States Patent
Hua et al.

(10) Patent No.: US 12,474,156 B2
(45) Date of Patent: Nov. 18, 2025

(54) LINEAR HALL-BASED ECCENTRICITY DIAGNOSIS METHOD AND DETECTION SYSTEM FOR PERMANENT MAGNET MOTOR

(71) Applicant: SOUTHEAST UNIVERSITY, Jiangsu (CN)

(72) Inventors: Wei Hua, Jiangsu (CN); Yuchen Wang, Jiangsu (CN); Chao Zhang, Jiangsu (CN); Kai Liu, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 111 days.

(21) Appl. No.: 18/279,211

(22) PCT Filed: Nov. 29, 2021

(86) PCT No.: PCT/CN2021/133956
§ 371 (c)(1),
(2) Date: Aug. 29, 2023

(87) PCT Pub. No.: WO2023/035421
PCT Pub. Date: Mar. 16, 2023

(65) Prior Publication Data
US 2024/0183649 A1      Jun. 6, 2024

(30) Foreign Application Priority Data
Sep. 8, 2021      (CN) .......................... 202111049671.3

(51) Int. Cl.
*G01B 7/312*      (2006.01)
*G01R 33/07*      (2006.01)

(52) U.S. Cl.
CPC ........... *G01B 7/312* (2013.01); *G01R 33/072* (2013.01)

(58) Field of Classification Search
CPC ...... G01B 7/312; G01R 33/072; G01R 31/34; G01R 31/343
(Continued)

(56) References Cited

U.S. PATENT DOCUMENTS 11,579,197 B2 *   2/2023   Clark .................. G01D 5/2451
2013/0338939 A1   12/2013  Nandi et al.
(Continued)

FOREIGN PATENT DOCUMENTS

CN      102590646      7/2012
CN      107192947      9/2017
(Continued)

OTHER PUBLICATIONS

"International Search Report (Form PCT/ISA/210) of PCT/CN2021/133956", mailed on May 27, 2022, with English translation thereof, pp. 1-6.

(Continued)

*Primary Examiner* — Giovanni Astacio-Oquendo
(74) *Attorney, Agent, or Firm* — JCIPRNET

(57) ABSTRACT

A linear Hall-based eccentricity diagnosis method and detection system for a permanent magnet motor. First, three linear Hall elements are mounted in stator slots at the same space interval, respectively; second, analog signals output by the three-phase linear Hall are converted into digital signals by means of a digital signal processor, and the digital signals are converted into a quadrature signal by means of linear combination; then, a negative sequence signal and a sideband signal are extracted from the quadrature signal by means of a complex factor filter; then the amplitude of the negative sequence signal and the amplitude of the sideband signal are extracted by means of synchronous reference frame phase-locked loops as a static eccentricity indicator and a dynamic eccentricity indicator; finally, percentages (Continued)

representing the degrees of eccentricity are calculated from the static eccentricity indicator and the dynamic eccentricity indicator in the digital signal processor.

10 Claims, 5 Drawing Sheets

(58) Field of Classification Search
USPC .............................. 324/662, 661, 649, 600
See application file for complete search history.

(56) References Cited

U.S. PATENT DOCUMENTS

| | | | |
|---|---|---|---|
| 2014/0225601 A1* | 8/2014 | Hobelsberger | G01R 31/343 324/222 |
| 2016/0126883 A1* | 5/2016 | Yoo | G01R 35/00 318/400.22 |
| 2016/0216333 A1* | 7/2016 | Clark | G01D 5/2451 |
| 2024/0319305 A1* | 9/2024 | Ludwig | G01R 19/0092 |

FOREIGN PATENT DOCUMENTS

| | | |
|---|---|---|
| CN | 107423261 | 12/2017 |
| CN | 108614212 | 10/2018 |
| CN | 109541461 | 3/2019 |
| CN | 111740672 | 10/2020 |
| CN | 113094952 | 7/2021 |
| CN | 113258741 | 8/2021 |
| CN | 113686237 | 11/2021 |

OTHER PUBLICATIONS

Zheng, Yufang et al., "Development and Research on Virtual Instrument System of Motor's Fault Diagnosis Based on Current Analysis," Computer Measurement & Control, vol. 18, Mar. 2010, pp. 512-514.

* cited by examiner

LINEAR HALL-BASED ECCENTRICITY DIAGNOSIS METHOD AND DETECTION SYSTEM FOR PERMANENT MAGNET MOTOR

CROSS-REFERENCE TO RELATED APPLICATION

This application is a 371 of international application of PCT application serial no. PCT/CN2021/133956, filed on Nov. 29, 2021, which claims the priority benefit of China application no. 202111049671.3, filed on Sep. 8, 2021. The entirety of each of the above mentioned patent applications is hereby incorporated by reference herein and made a part of this specification.

TECHNICAL FIELD

The present invention relates to an eccentricity detection technology of a permanent magnet motor, particularly discloses a linear Hall-based eccentricity diagnosis method and a detection system for a permanent magnet motor, and belongs to the technical field of power generation, transformation or distribution.

RELATED ART

Rotor eccentricity is one of the most common faults in motors, and rotor eccentricity in permanent magnet synchronous motors directly leads to asymmetrical air gap lengths, thereby resulting in unbalanced magnetic pull between a stator and a rotor. The unbalanced magnetic pull will further lead to other electrical and mechanical problems, such as unbalanced current loads in different phases, noise and vibration. Continuous operation of permanent magnet synchronous motors will result in bearing wear, increased eccentricity and even bearing fracture. Therefore, it is essential to monitor and diagnose the rotor eccentricity in the practical application of permanent magnet synchronous motors.

The most direct detection method is to determine the rotor eccentricity by detecting the magnetic field distribution inside the permanent magnet motor. The invention patent with the Patent No. CN107192947A discloses a permanent magnet synchronous motor fault diagnosis method on the basis of magnetic field monitoring. When coil fault values corresponding to coils wound on all stator teeth of a permanent magnet synchronous motor form two peaks, the fault type is determined to be an eccentric fault. The invention patent with the Patent No. CN109541461A discloses a permanent magnet synchronous motor eccentric fault diagnosis method on the basis of magnetic field distribution monitoring, in which a coil is wound on each stator tooth, the harmonic distribution is further analyzed by deducing the flux linkage value from the col voltage when the rotor rotates, such that the type, degree and direction of eccentric fault can be accurately identified. In the above method of detecting eccentricity based on an additional winding, the voltage amplitude of the additional winding is proportional to the rotational speed, resulting in great changes in the amplitude of output signal at different rotational speeds, which makes data collection difficult and increases the cost of hardware.

In order to realize the decoupling of signal amplitude and rotational speed, a linear Hall sensor can be used as a magnetic density detection element. The invention patent with the Patent No. CN108614212A discloses a decoupling diagnosis method and a device for hub motor eccentricity and demagnetization fault. According to the method, 2N Hall sensors are mounted in two stator slots radially symmetrical to the center axis of a hub motor, N Hall sensors are arranged equal intervals in an axial direction in each stator slot, Hall sensors in the two radially symmetrical stator slots are on the same diameter line, and the 2N Hall sensors are connected to an upper computer through a multi-channel voltage signal acquisition box. Faults are accurately identified based on the fault characteristics values to achieve a purpose of decoupling diagnosis of eccentricity and demagnetization coupled faults. However, the method cannot achieve accurate detection in a specific static eccentric state. The invention patent with the patent number CN113094952A discloses a static eccentricity detection method for permanent magnet motors on the basis of stray magnetic fields. In the method, the use of a neural network model increases the computational burden for eccentricity detection, and errors between the neural network model and actual motor parameters make the robustness of the detection lower, thereby involving a huger computational burden. In addition, none of the above detection methods is capable of realizing the eccentricity detection of the rotor permanent magnet type motor and the stator permanent magnet type motor at the same time.

The present application aims to accurately and quickly detect and separate static and dynamic eccentricity detection quantities in permanent magnet synchronous motors by reasonably mounting linear Hall elements and designing eccentricity detection algorithms universal to permanent magnet synchronous motors of different topologies.

SUMMARY OF INVENTION

In order to solve the defects in the above background art, the present invention aims to provide a linear Hall-based eccentricity diagnosis method and a detection system for a permanent magnet motor, linear Hall sensors for detecting the radial flux density mounted in the stator slots of a permanent magnet synchronous is capable of processing output signals from the lineal Hall sensors to obtain the real-time static and dynamic eccentricity detection quantities of a rotor, thereby achieving the purpose of real-time non-invasive eccentricity detection for permanent magnet motors of various topologies at a low cost, and solving the technical problems that the prior technology of eccentricity detection of permanent magnet motors involves difficulty in data collection, high cost of hardware and inability to realize simultaneous detection of static and dynamic eccentricity for motors of different topologies.

In order to achieve the above objective, the present invention provides the following technical solutions:

the present invention provides a linear Hall-based eccentricity diagnosis method for a permanent magnet motor, which is implemented by a detection system consisting of three linear Hall elements mounted in stator slots at the same space interval and a digital signal processor. Magnetically sensitive surfaces of the three Hall elements are all opposite surfaces of a rotor with permanent magnets; among the three linear Hall elements, the first linear Hall element is mounted at any position in the stator slot, the second linear Hall element is spaced apart from the first linear Hall element in a circumferential direction by an electrical angle phase difference of and the third linear Hall element is spaced apart from the second linear Hall element in a circumferential direction by an electrical angle phase difference of $\varphi_s$. Then, the degree of motor eccentricity is calculated based on the output voltage signals of the three linear Hall elements.

The eccentricity diagnosis method for calculating the degree of motor eccentricity is calculated based on the output voltage signals of the three linear Hall elements is as follows:

(1) The digital signal processor converts the output voltage signals of the three linear Hall elements into digital signals through an analog-to-digital converter, and the digital signals are three-phase signals.

(2) The three-phase signals are processed into a quadrature signal with harmonics.

Assuming that the signals output by the three linear Halls are $H_{abc}=[H_a, H_b, H_c]^T$, wherein $H_a$ signal comes from the second linear Hall element, $H_b$ signal comes from the first linear Hall element, and $H_c$ comes from the third linear Hall element. The preprocessing process involves a linear combination of $H_{abc}$, the three-phase signal is mapped to the two-phase stationary coordinate system, and the processed quadrature signal is $H_{\alpha\beta0}=[H_\alpha\ H_\beta\ H_0]^T$, wherein, $H_\alpha$ and $H_\beta$ are quadrature components, and $H_0$ is a DC component. The model of the above linear combination is:

$$H_{\alpha\beta0} = T_{APS} H_{abc}$$

$$T_{APS} = KT = K \begin{bmatrix} 1 & \cos\varphi_s & \cos\varphi_s \\ 0 & \sin\varphi_s & -\sin\varphi_s \\ -\cos\varphi_s & 1/2 & 1/2 \end{bmatrix}$$

$$K = \begin{bmatrix} \dfrac{1}{1+2\cos^2\varphi_s} & 0 & -\dfrac{1+2\cos\varphi_s}{(1-\cos\varphi_s)(1+2\cos^2\varphi_s)} \\ 0 & \dfrac{1}{2\sin^2\varphi_s} & 0 \\ 0 & 0 & \dfrac{1}{1-\cos\varphi_s} \end{bmatrix}$$

(3) A complex factor filter with harmonic selection capability is configured to extract negative sequence signals and sideband signals from the above quadrature signal.

The complex factor filter is composed of a first detection filter, a second detection filter and a third detection filter that are interconnected to one another. The quadrature signal $H_{\alpha\beta0}$ minus the output of the three detection filters is taken as an intermediate signal. The intermediate signal is added to the output signal of the first detection filter as the input signal of the first detection filter, and the output signal of the first detection filter is a positive sequence signal; the intermediate signal is added to the output signal of the second detection filter as the input signal of the second detection filter, and the output signal of the second detection filter is a negative sequence signal; the intermediate signal is added to the output signal of the third detection filter as the input signal of the third detection filter, and the output signal of the second detection filter is a sideband signal.

The first detection filter extracts positive sequence signal having the same frequency as the rotating electrical frequency of the motor rotor from the quadrature signal, and the first detection filter can be expressed as:

$$F_1(s) = \frac{\omega_c}{s - j\omega_0 + \omega_c}$$

wherein, $\omega_0$ is the frequency of the positive sequence signal, which is the same as the rotating electrical frequency of the motor rotor; $\omega_c = k_c * \omega_0$, $k_c$ is a positive number and can be used to adjust the bandwidth of the detection filter, and $\omega_c$ is a cut-off frequency.

The second detection filter is capable of extracting negative sequence signals having the same frequency as the rotating electrical frequency of the motor rotor from the quadrature signal, and the second detection filter can be expressed as:

$$F_2(s) = \frac{\omega_c}{s + j\omega_0 + \omega_c}$$

The third detection filter is capable of extracting sideband signals near the positive sequence signals from the quadrature signal, and the third detection filter can be expressed as:

$$F_3(s) = \frac{\omega_c}{s - j(1 - 1/p)\omega_0 + \omega_c}$$

wherein, p is the number of pole pairs of the permanent magnet motor.

(4) The amplitude of the negative sequence signals is extracted by means of phase-locked loops of a first synchronous reference system as a static eccentricity indicator, and the amplitude of the negative sequence signals is extracted by means of phase-locked loops of a second synchronous reference system as a dynamic eccentricity indicator.

(5) Twice the ratio of the static eccentricity indicator to the amplitude of the positive sequence component is taken as a static eccentricity percentage; the ratio of the dynamic eccentricity indicator to the amplitude of the positive sequence component is taken as a dynamic eccentricity percentage, and the static eccentricity percentage value and the dynamic eccentricity percentage value are taken as an eccentricity diagnosis quantity.

By employing the above technical solutions, the present invention has the following beneficial effects:

(1) The present invention the radial magnetic density of permanent magnet motors with different topological structures by mounting the Hall sensors at the same space interval in the stator slots in a circumferential direction, rapidly detects the real-time eccentricity by performing linear combination, complex factor filtering, and phase-locking processing on the output data of the Hall sensors in sequence, effectively separates static eccentricity detection quantity and dynamic eccentricity detection quantity, overcomes the defect that existing eccentricity detection methods cannot accurately detect static eccentricity in a specific state, realizes highly compact and low-cost eccentricity detection of permanent magnet motors with multi-topology structures, and realizes the separation of static eccentricity and dynamic eccentricity.

(2) The eccentricity diagnosis method for a permanent magnet motor disclosed in the present invention can be implemented by adopting a non-invasive detection system consisting of low-cost Hall sensors and a digital signal processor, and solves the problems of difficulty in data and reduces the cost of hardware compared with the eccentricity diagnosis method for a permanent magnet motor by means of additional windings.

DESCRIPTION OF REFERENCE NUMERALS IN THE DRAWINGS

1. first linear Hall element; 2. second linear Hall element; 3. third linear Hall element; 4. motor under detection; 6. linear combination unit; 8. complex factor filter; 13. digital signal processor; 14. first addition and subtraction combination module; 15. second addition and subtraction combination module; 16. third addition and subtraction combination module; 17. fourth addition and subtraction combination module; and 18. fifth addition and subtraction combination module.

DESCRIPTION OF EMBODIMENTS

The technical solution of the present invention will be further described below in conjunction with the accompanying drawings.

Figure 1:
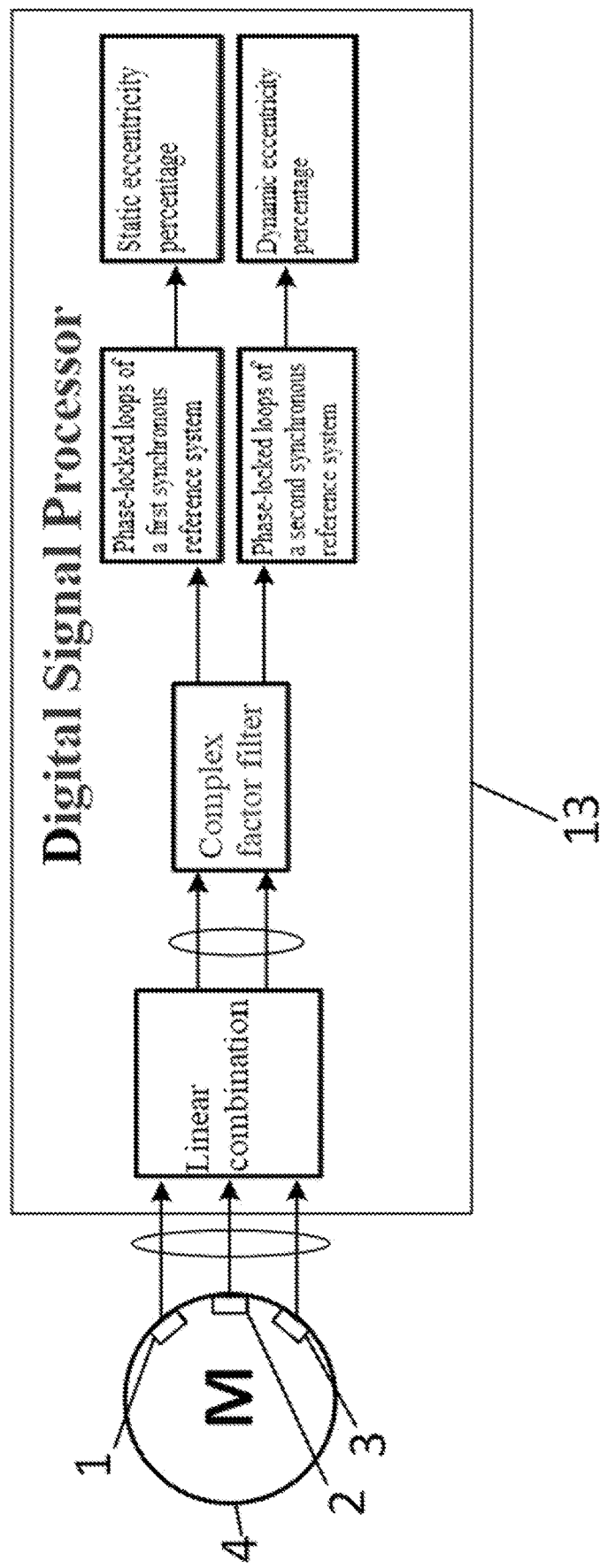
FIG. 1 is a block diagram of a linear hall-based eccentricity detection system for permanent magnet motor provided in the present invention.
Figure 2:
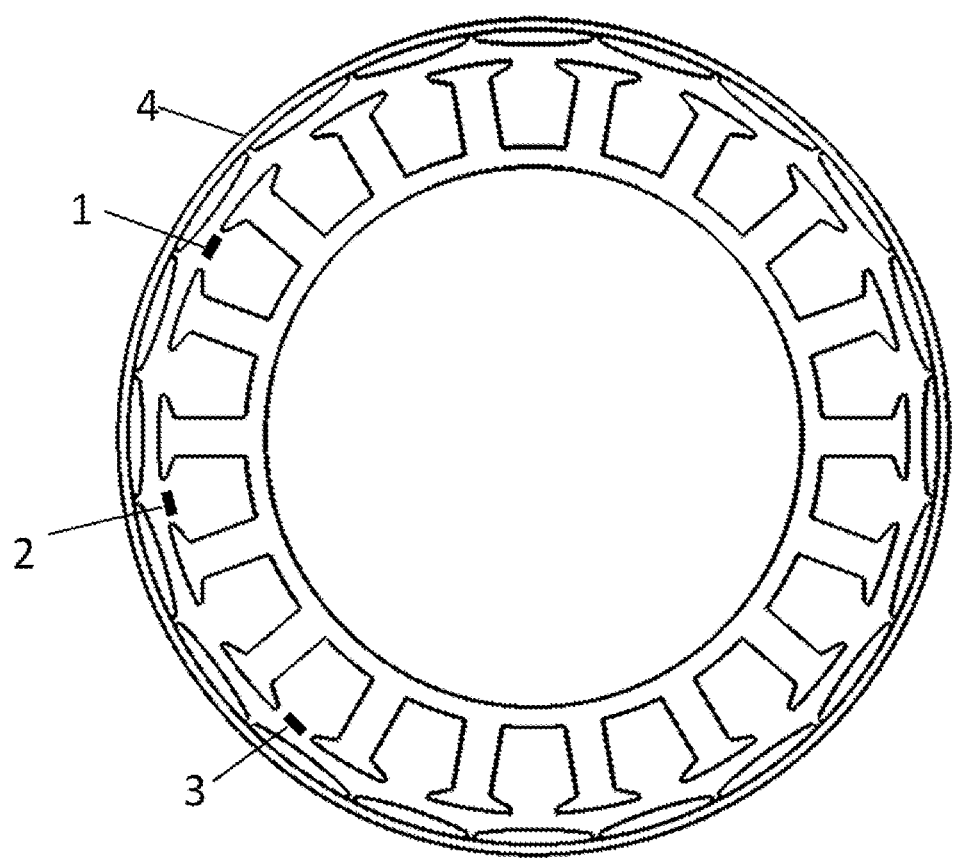
FIG. 2 is a rotor permanent magnet motor in Embodiment 1.
Figure 3:
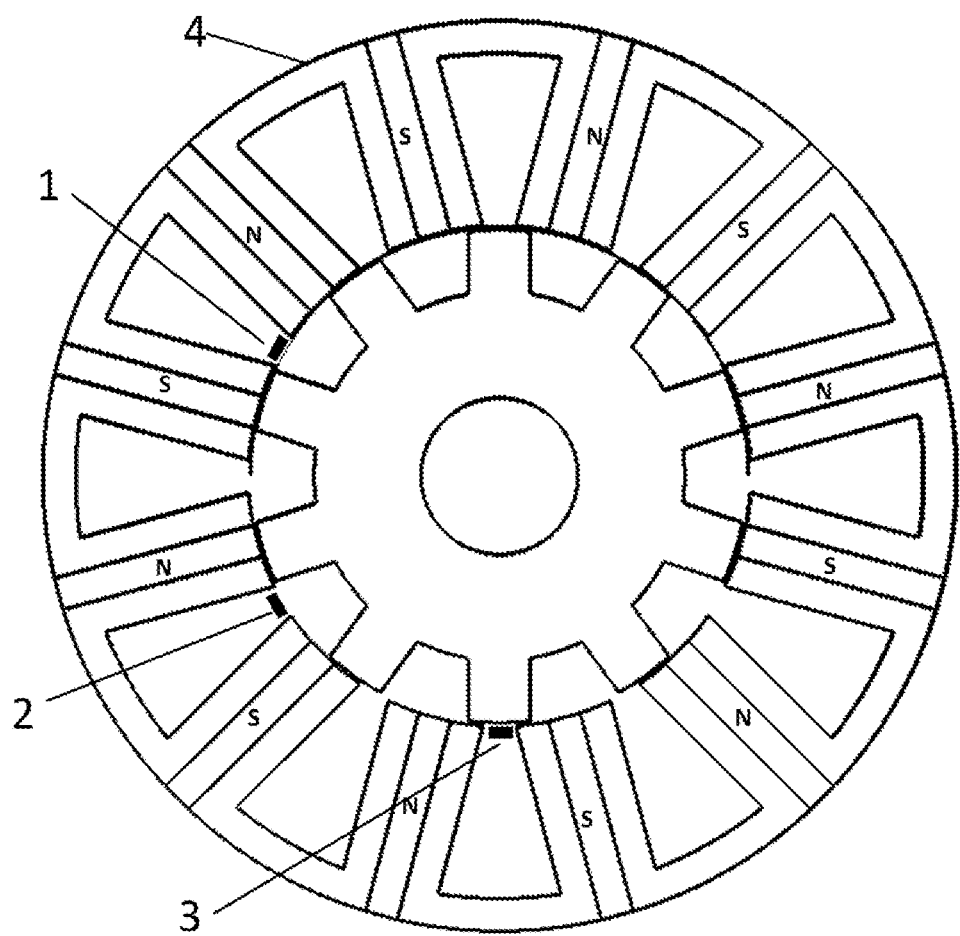
FIG. 3 is a stator permanent magnet motor in Embodiment 2.

Embodiment 1: Diagnosing an Eccentricity of a Rotor Permanent Magnet Motor on the Basis of Linear Hall Elements With reference to FIG. 1, the present invention provides a linear Hall-based eccentricity diagnosis method and a detection system for a permanent magnet motor, the detection system includes: a first linear Hall element 1, a second linear Hall element 2 and a third linear Hall element 3 mounted in a stator slot of a motor under detection 4, and a digital signal processor 13 for processing the output voltage of the Hall elements. As shown in FIG. 2, the motor under detection 4 is a three-phase 18-slot and 20-pole rotor permanent magnet motor. Three linear Hall elements are mounted in the stator slots at intervals of 2 stator slot pitches, and magnetically sensitive surfaces of the Hall elements are all opposite surfaces of a rotor with permanent magnets; among the three linear Hall elements, the first linear Hall element 1 is mounted in any slot of the stator, the second linear Hall element 2 is spaced apart from the first linear Hall element 1 in a circumferential direction by an electrical angle phase difference of $\varphi_s = 2\pi/9$, and the third linear Hall element 3 is spaced apart from the second linear Hall element 2 in a circumferential direction by an electrical angle phase difference of $\varphi_s = 2\pi/9$.

Taking the counterclockwise direction as a forward direction, when the rotor rotates in the forward direction at a constant speed, an electrical angle phase difference of output voltage signals between the first linear Hall element 1 and the second linear Hall element 2 is $\varphi_s = 2\pi/9$, and an electrical angle phase difference of output voltage signals between the second linear Hall element 2 and the third linear Hall element 3 is $\varphi_s = 2\pi/9$.

The three linear Hall elements are connected to the digital signal processor 13. The power supply voltage of the digital signal processor 13 is 3.3 V. $H_a$ signal comes from the second linear Hall element 2, $H_b$ signal comes from the second linear Hall element 1, $H_c$ signal comes from the second linear Hall element 3, and the three linear Hall elements output analog voltages ranging from 0 V to 3.3 V. In the digital signal processor 13, the output voltage signals of the three linear Hall elements are converted into three-phase original digital signals, expressed as $H_{abc} = [H_a, H_b, H_c]^T$.

The three-phase signals are made as a linear combination, shown in the following formula:

$$H_{\alpha\beta0} = T_{APS} H_{abc}$$

wherein:
$$T_{APS} = KT = K \begin{bmatrix} 1 & \cos\frac{2\pi}{9} & \cos\frac{2\pi}{9} \\ 0 & \sin\frac{2\pi}{9} & -\sin\frac{2\pi}{9} \\ -\cos\frac{2\pi}{9} & 1/2 & 1/2 \end{bmatrix}$$

$$K = \begin{bmatrix} \dfrac{1}{1+2\cos^2\frac{2\pi}{9}} & 0 & -\dfrac{1+2\cos\frac{2\pi}{9}}{\left(1-\cos\frac{2\pi}{9}\right)\left(1+2\cos^2\frac{2\pi}{9}\right)} \\ 0 & \dfrac{1}{2\sin^2\frac{2\pi}{9}} & 0 \\ 0 & 0 & \dfrac{1}{1-\cos\frac{2\pi}{9}} \end{bmatrix}$$

The quadrature signal obtained upon the linear combination processing is $H_{\alpha\beta 0} = [H_\alpha, H_\beta, H_0]^T$.

A complex factor filter with harmonic selection capability is configured to extract negative sequence signals and sideband signals from the quadrature signal.

Figure 4:
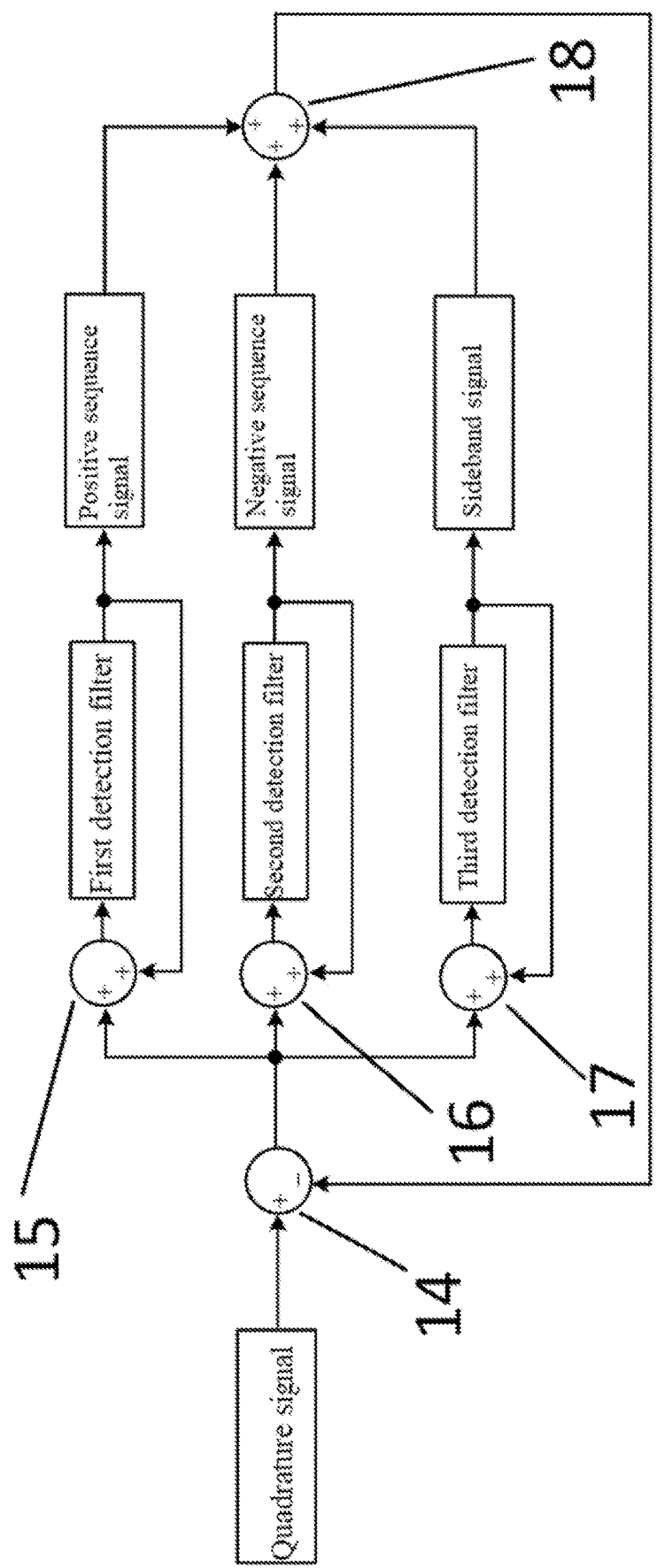
FIG. 4 is a block diagram of a complex factor filter in a linear Hall-based eccentricity diagnosis method and a detection system for a permanent magnet motor provided in the present invention.

As shown in FIG. 4, the complex factor filter is composed of a first detection filter, a second detection filter and a third detection filter that are interconnected to one another. The quadrature signal minus the output of the three detection filters is taken as an intermediate signal, which is completed by a first addition and subtraction combination module 14, and the output of the three detection filters is summed by a fifth addition and subtraction combination module 18 and then transmitted to the first addition and subtraction combination module 14. The intermediate signal is added to the output signal of the first detection filter as the input signal of the first detection filter, which is completed by a second addition and subtraction combination module 15; the intermediate signal is added to the output signal of the second detection filter as the input signal of the second detection filter, which is completed by a third addition and subtraction combination module 16; and the intermediate signal is added to the output signal of the third detection filter as the input signal of the third detection filter, which is completed by a fourth addition and subtraction combination module 17.

The first detection filter extracts positive sequence signal having the same frequency as the rotating electrical frequency of the motor rotor from the quadrature signal, and the first detection filter can be expressed as:

$$F_1(s) = \frac{\omega_c}{s - j\omega_0 + \omega_c}$$

wherein, $\omega_0$ is the frequency of the positive sequence signal, $\omega_0 = k_c \cdot \omega_0$, $k_c = 0.707$.

The second detection filter extracts negative sequence signal having the same frequency as the rotating electrical frequency of the motor rotor from the quadrature signal, and the second detection filter can be expressed as:

$$F_2(s) = \frac{\omega_c}{s + j\omega_0 + \omega_c}$$

The third detection filter extracts sideband signals near the positive sequence signal from the quadrature signal, and the third detection filter can be expressed as:

$$F_3(s) = \frac{\omega_c}{s - j(1 - 1/p)\omega_0 + \omega_c}$$

wherein, p is the number of pole pairs of the permanent magnet motor, and p=10.

The amplitude of the negative sequence signals is extracted by means of phase-locked loops of a first synchronous reference system as a static eccentricity indicator, and the amplitude of the negative sequence signals is extracted by means of phase-locked loops of a second synchronous reference system as a dynamic eccentricity indicator.

Finally, twice the ratio of the static eccentricity indicator to the amplitude of the positive sequence component is taken as a static eccentricity percentage; the ratio of the dynamic eccentricity indicator to the amplitude of the positive sequence component is taken as a dynamic eccentricity percentage, and the percentage value is taken as an eccentricity diagnosis quantity.

Figure 5:
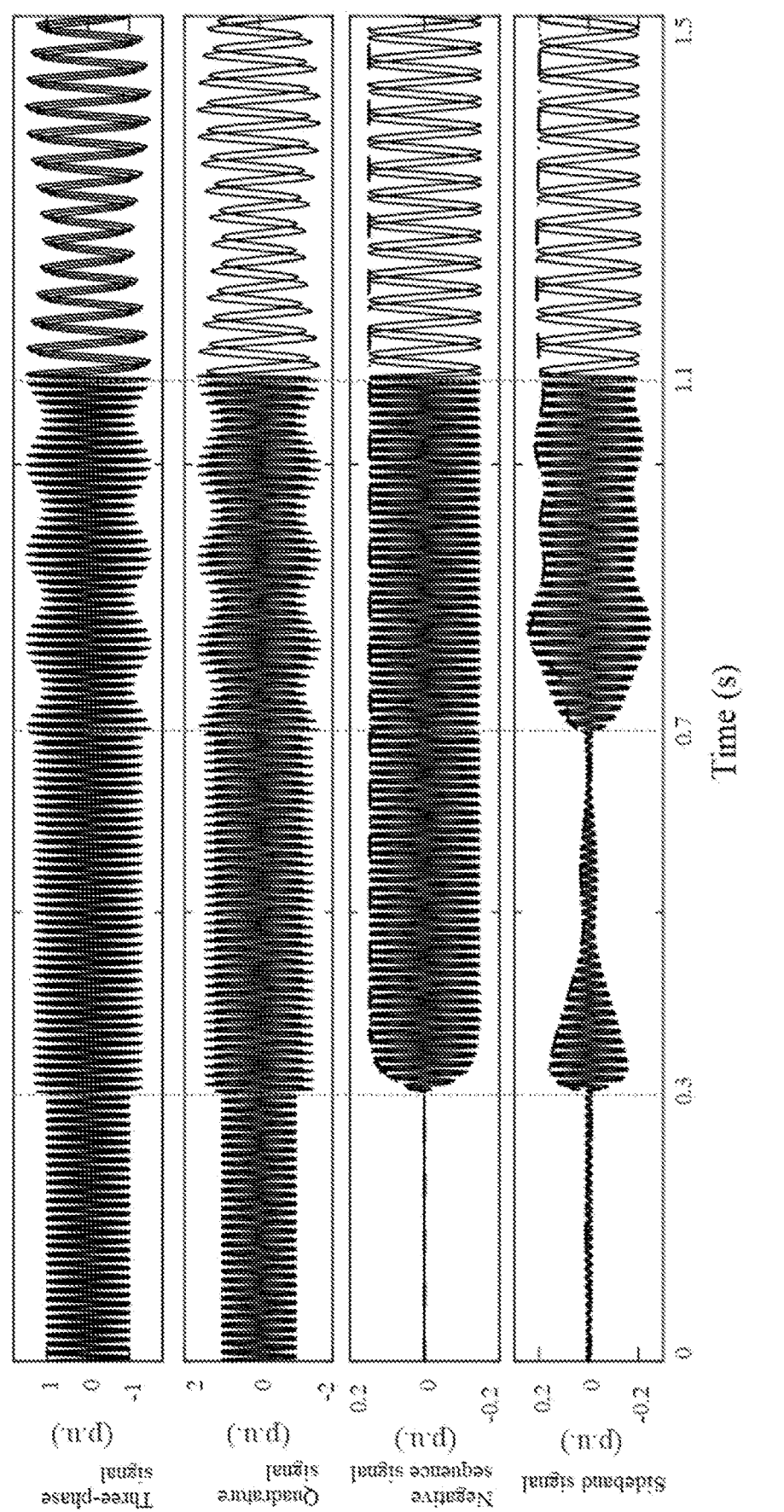
FIG. 5 is a waveform diagram of three-phase signals output by three linear Hall elements and their corresponding quadrature signal, negative sequence signal, and sideband signal in Embodiment 1.

The following simulation is performed in combination with specific eccentricity conditions, and the results are illustrated in FIG. 5, which shows the three-phase signal, quadrature signal, negative sequence signal and sideband signal, respectively. The amplitude of the negative sequence signals extracted by means of the phase-locked loops of a first synchronous reference system is shown by a dotted line, and the amplitude of the negative sequence signals is extracted by means of the phase-locked loops of a second synchronous reference system is shown by a dotted line.

(1) Before 0.3 s, the motor under detection 4 is in a non-eccentric state, and the signal frequency is 600 Hz. The negative sequence component output by the complex factor filter is 0; and the sideband component is 0.

(2) Between 0.3 s and 0.7 s, the signal frequency is 600 Hz, the motor under detection 4 is in a static eccentric state, and the static eccentric distance is 0.3 times the air gap length. The amplitude of the negative sequence signals output by the complex factor filter rises and stabilizes to be a constant value; the amplitude of the sideband signals first rises and then converges to 0. Since the dynamic eccentricity is a time-varying static eccentricity, there will be malfunctions when the static eccentricity first appears, but a predicted value of the dynamic eccentricity will converge to the actual value in a short time.

(3) Between 0.7 s and 1.1 s, the signal frequency is 600 Hz, the motor under detection 4 is in a mixed eccentric state, the static eccentric distance is 0.3 times the air gap length, and the dynamic eccentric distance is 0.2 times the air gap length. The amplitude of the negative sequence signals output by the complex factor filter remains basically unchanged; the amplitude of the sideband signals rises and remains basically unchanged.

(4) Between 1.1 s and 1.5 s, the signal frequency is 600 Hz, the motor under detection 4 is in a mixed eccentric state, the static eccentric distance is 0.3 times the air gap length, and the speed changes from 600 Hz to 200 Hz. The results of eccentricity detection remain basically unchanged, and the system is suitable for different speeds.

Finally, twice the ratio of the static eccentricity indicator to the amplitude of the positive sequence component is taken as a static eccentricity percentage 30%; and the ratio of the dynamic eccentricity indicator to the amplitude of the positive sequence component is taken as a dynamic eccentricity percentage 20%.

Embodiment 2: Diagnosing an Eccentricity of a Stator Permanent Magnet Motor on the Basis of Linear Hall Elements With reference to FIG. 1, the present invention provides a linear Hall-based eccentricity diagnosis method and detection system for permanent magnet motor, and as shown in FIG. 4, the motor under detection is a three-phase 12-slot and 10-pole stator permanent magnet motor. Three linear Hall elements are mounted in the stator slots at intervals of 1 stator slot pitch. Magnetically sensitive surfaces of the Hall elements are all opposite salient-pole surfaces of a rotor with permanent magnets; among the three linear Hall elements, the first linear Hall element 1 is mounted in any slot of the stator, the second linear Hall element 2 is spaced apart from the first linear Hall element 1 in the same direction by an electrical angle phase difference of $\varphi_s=2\pi/3$, and the third linear Hall element 3 is spaced apart from the second linear Hall element 2 in the same direction by an electrical angle phase difference of $\varphi_s=2\pi/3$.

Taking the counterclockwise direction as a forward direction, when the rotor rotates in the forward direction at a constant speed, an electrical angle phase difference of output voltage signal between the first linear Hall element 1 and the second linear Hall element 2 is $\varphi_s=2\pi/3$, and an electrical angle phase difference of output voltage signal between the second linear Hall element 2 and the third linear Hall element 3 is $\varphi_s=2\pi/3$.

The three linear Hall elements are connected to the digital signal processor 13. The power supply voltage of the digital signal processor 13 is 3.3 V. $H_a$ signal comes from the second linear Hall element 2, $H_b$ signal comes from the second linear Hall element 1, $H_c$ signal comes from the second linear Hall element 3, and the three linear Hall elements output analog voltages ranging from 0 V to 3.3 V. In the digital signal processor, the output voltage signals of the three linear Hall elements are converted into three-phase original digital signal, expressed as $H_{abc}=[H_a, H_b, H_c]^T$.

A progressive linear combination of the three-phase signals is as follows:

$$H_{\alpha\beta 0} = T_{APS} H_{abc}$$

wherein: $T_{APS} = KT = K \begin{bmatrix} 1 & \cos\frac{2\pi}{9} & \cos\frac{2\pi}{9} \\ 0 & \sin\frac{2\pi}{9} & -\sin\frac{2\pi}{9} \\ -\cos\frac{2\pi}{9} & 1/2 & 1/2 \end{bmatrix}$ -continued $$K = \begin{bmatrix} \dfrac{1}{1+2\cos^2\dfrac{2\pi}{9}} & 0 & -\dfrac{1+2\cos\dfrac{2\pi}{9}}{\left(1-\cos\dfrac{2\pi}{9}\right)\left(1+2\cos^2\dfrac{2\pi}{9}\right)} \\ 0 & \dfrac{1}{2\sin^2\dfrac{2\pi}{9}} & 0 \\ 0 & 0 & \dfrac{1}{1-\cos\dfrac{2\pi}{9}} \end{bmatrix}$$

The processed quadrature signal is $H_{\alpha\beta 0}=[H_\alpha, H_\beta, H_0]^T$.

A complex factor filter with harmonic selection capability is configured to extract negative sequence signals and sideband signals from the quadrature signal.

The complex factor filter is composed of a first detection filter, a second detection filter and a third detection filter that are interconnected to one another. The quadrature signal minus the output of the three detection filters is taken as an intermediate signal. The intermediate signal is added to the output signal of the first detection filter as the input signal of the first detection filter; the intermediate signal is added to the output signal of the second detection filter as the input signal of the second detection filter; and the intermediate signal is added to the output signal of the third detection filter as the input signal of the third detection filter.

The first detection filter extracts positive sequence signal having the same frequency as the rotating electrical frequency of the motor rotor from the quadrature signal, and the first detection filter can be expressed as:

$$F_1(s) = \frac{\omega_c}{s - j\omega_0 + \omega_c}$$

wherein, $\omega_0$ is the frequency of the positive sequence signal, $\omega_c = k_c * \omega_0$, $k_c = 0.707$.

The second detection filter is capable of extracting negative sequence signal having the same frequency as the rotating electrical frequency of the motor rotor from the quadrature signal, and the second detection filter can be expressed as:

$$F_2(s) = \frac{\omega_c}{s + j\omega_0 + \omega_c}$$

The third detection filter is capable of extracting sideband signal near the positive sequence signal from the quadrature signal, and the third detection filter can be expressed as:

$$F_3(s) = \frac{\omega_c}{s - j(1 - 1/p)\omega_0 + \omega_c}$$

wherein, p is the number of pole pairs of the permanent magnet motor, and p=10.

(4) The amplitude of the negative sequence signals is extracted by means of phase-locked loops of a first synchronous reference system as a static eccentricity indicator, and the amplitude of the negative sequence signals is extracted by means of phase-locked loops of a second synchronous reference system as a dynamic eccentricity indicator.

(5) Finally, twice the ratio of the static eccentricity indicator to the amplitude of the positive sequence component is taken as a static eccentricity percentage; the ratio of the dynamic eccentricity indicator to the amplitude of the positive sequence component is taken as a dynamic eccentricity percentage, and the percentage value is taken as an eccentricity diagnosis quantity.

The foregoing descriptions are merely preferred specific implementations of the present invention, and are not intended to limit the protection scope of the present invention. Any equivalent replacements or changes made by a person skilled in the art according to the technical solutions of the present invention and the inventive concepts thereof within the technical scope disclosed in the present invention shall fall within the protection scope of the present invention.

What is claimed is:

1. A linear Hall-based eccentricity diagnosis method for a permanent magnet motor, wherein a first linear Hall element, a second linear Hall element and a third linear Hall element are mounted in the stator slots at the same space interval in a circumferential direction, and magnetically sensitive surfaces of the first to third linear Hall elements are all opposite surfaces of a rotor with permanent magnets, the method comprising:

linearly combining output voltages of the first to third linear Hall elements to obtain a quadrature signal containing a pair of quadrature components and a DC component;

extracting positive sequence signals, negative sequence signals and sideband signals from the quadrature signal;

extracting the amplitude of the negative sequence signals thereby taken as a static eccentricity indicator;

extracting the amplitude of the sideband signals thereby taken as a dynamic eccentricity indicator;

obtaining a static eccentricity percentage by the ratio of the static eccentricity indicator to the amplitude of the positive sequence signals; and obtaining a dynamic eccentricity percentage by the ratio of the dynamic eccentricity indicator to the amplitude of the positive sequence signals.

2. The linear Hall-based eccentricity diagnosis method for the permanent magnet motor according to claim 1, wherein the quadrature signal containing a pair of quadrature components and a DC component obtained by a linear combination of the output voltages of the first to third linear Hall elements is expressed as: $H_{\alpha\beta 0}=T_{APS} H_{\alpha\beta 0}$, in which $H_{abc}$ is a vector composed of the output voltages of the first to third linear Hall elements; $H_{abc}=[H_a, H_b, H_c]^T$, in which $H_a$ is the output voltage of the second linear Hall element, $H_b$ is the output voltage of the first linear Hall element, $H_c$ is the output voltage of the third linear Hall element, and $H_{\alpha\beta 0}$ is the quadrature signal; $H_{\alpha\beta 0}=[H_\alpha, H_\beta, H_0]^T$, in which $H_\alpha$ and $H_\beta$ are the quadrature components, $H_0$ is the DC component, and $T_{APS}$ is a linear combination coefficient matrix;

$$T_{APS} = K \begin{bmatrix} 1 & \cos\varphi_s & \cos\varphi_s \\ 0 & \sin\varphi_s & -\sin\varphi_s \\ -\cos\varphi_s & 1/2 & 1/2 \end{bmatrix},$$

$$K = \begin{bmatrix} \dfrac{1}{1+2\cos^2\varphi_s} & 0 & -\dfrac{1+2\cos\varphi_s}{(1-\cos\varphi_s)(1+2\cos^2\varphi_s)} \\ 0 & \dfrac{1}{2\sin^2\varphi_s} & 0 \\ 0 & 0 & \dfrac{1}{1-\cos\varphi_s} \end{bmatrix},$$

in which $\varphi_s$ is an electrical angle between two adjacent linear Hall elements.

3. The linear Hall-based eccentricity diagnosis method for the permanent magnet motor according to claim 1, wherein the positive sequence signal extracted thereby is expressed as:

$$F_1(s) = \frac{\omega_c}{s - j\omega_0 + \omega_c},$$

in which $F_1(s)$ is an expression of the positive sequence signal in the s domain, $\omega_0$ is the frequency of the positive sequence signal, $\omega_c$ is a cut-off frequency, $\omega_c = k_c * \omega_0$, and $k_c$ is a positive number.

4. The linear Hall-based eccentricity diagnosis method for the permanent magnet motor according to claim 1, wherein the negative sequence signal extracted thereby is expressed as:

$$F_2(s) = \frac{\omega_c}{s + j\omega_0 + \omega_c},$$

in which $F_2(S)$ is an expression of the negative sequence signal in the s domain, $\omega_0$ is the frequency of the positive sequence signal, $\omega_c$ is a cut-off frequency, $\omega_c = k_c * \omega_0$, and $k_c$ is a positive number.

5. The linear Hall-based eccentricity diagnosis method for the permanent magnet motor according to claim 1, wherein the sideband signal extracted thereby is expressed as:

$$F_3(s) = \frac{\omega_c}{s - j(1 - 1/p)\omega_0 + \omega_c},$$

in which $F_3(s)$ is an expression of the sideband signal in the s domain, $\omega_0$ is the frequency of the positive sequence signal, $\omega_c$ is a cut-off frequency, $\omega_c = k_c * \omega_0$, $k_c$ is a positive number, and p is the number of pole pairs of the permanent magnet motor.

6. The linear Hall-based eccentricity diagnosis method for the permanent magnet motor according to claim 1, wherein the static eccentricity percentage is twice the ratio of the static eccentricity indicator to the amplitude of the positive sequence signal.

7. The linear Hall-based eccentricity diagnosis method for the permanent magnet motor according to claim 1, wherein the method is used to detect a stator permanent magnet motor or a rotor permanent magnet motor.

8. A linear Hall-based eccentricity detection system for a permanent magnet motor, comprising:
a first linear Hall element mounted in stator slots, and magnetically sensitive surfaces of the first linear Hall element are opposite surfaces of a rotor with permanent magnets;
a second linear Hall element mounted in the stator slots and spaced apart from the first linear Hall element in a circumferential direction by an electrical angle phase difference of $\varphi_s$, and magnetically sensitive surfaces of the second linear Hall element are opposite surfaces of a rotor with permanent magnets;
a third linear Hall element mounted in the stator slots and spaced apart from the first linear Hall element in a circumferential direction by an electrical angle phase difference of $\varphi_s$, and magnetically sensitive surfaces of the third linear Hall element are opposite surfaces of a rotor with permanent magnets; and
a digital signal processor, wherein output voltages of the first to third linear Hall elements are linearly combined to obtain a quadrature signal containing a pair of quadrature components and a DC component, positive sequence signals, negative sequence signals and sideband signals are extracted from the quadrature signal, the amplitude of the negative sequence signals extracted thereby is taken as a static eccentricity indicator, the amplitude of the sideband signals extracted thereby is taken as a dynamic eccentricity indicator, a static eccentricity percentage is obtained by the ratio of the static eccentricity indicator to the amplitude of the positive sequence signals, and a dynamic eccentricity percentage is obtained by the ratio of the dynamic eccentricity indicator to the amplitude of the positive sequence signals.

9. The linear Hall-based eccentricity detection system for the permanent magnet motor according to claim 8, wherein the digital signal processor comprises:
a linear combination unit, which receives the output voltages of the first to third linear Hall elements, and outputs a quadrature signal containing a pair of quadrature components and a DC component;
a complex factor filter, an input end of the complex factor filter is connected to an output end of the linear combination unit, positive sequence signals, negative sequence signals and sideband signals are extracted from the quadrature signal and then output;
phase-locked loops of a first synchronous reference system, which receives the negative sequence signal output by the complex factor filter, and extracts the amplitude of the negative sequence signal and then outputs;
phase-locked loops of a second synchronous reference system, which receives the sideband signal output by the complex factor filter, and extracts the amplitude of the sideband signal and then outputs; and
a calculation unit, which receives the amplitude of the negative sequence signal and the amplitude of the sideband signal output by the complex factor filter, receives the positive sequence signal output by the complex factor filter, calculates the ratio of the amplitude of the negative sequence signal to the amplitude of the positive sequence signal and then outputs a static eccentricity percentage, calculates the ratio of the amplitude of the sideband signal to the amplitude of the positive sequence signal and then outputs a dynamic eccentricity percentage.

10. The linear Hall-based eccentricity detection system for the permanent magnet motor according to claim 9, wherein the complex factor filter comprises:
a first addition and subtraction combination module, a first input end of the first addition and subtraction combination module is connected to the quadrature signal, and a second input of the first addition and subtraction combination module is connected to an output end of a fifth addition and subtraction combination module, and outputs an intermediate signal after eliminating the positive sequence signal, negative sequence signal, and sideband signal from the quadrature signal;
a second addition and subtraction combination module, a first input end of the second addition and subtraction combination module is connected to an output end of the first addition and subtraction combination module, and a second output end of the second addition and subtraction combination module is connected to an output end of a first detection filter, and outputs an accumulation result of the intermediate signal and the positive sequence signal;

a third addition and subtraction combination module, a first input end of the third addition and subtraction combination module is connected to an output end of the first addition and subtraction combination module, and a second output end of the third addition and subtraction combination module is connected to an output end of a second detection filter, and outputs an accumulation result of the intermediate signal and the negative sequence signal;

a fourth addition and subtraction combination module, a first input end of the fourth addition and subtraction combination module is connected to an output end of the first addition and subtraction combination module, and a second output end of the fourth addition and subtraction combination module is connected to an output end of a third detection filter, and outputs an accumulation result of the intermediate signal and the sideband signal;

the first detection filter, wherein an input end of the first detection filter is connected to an output end of the second addition and subtraction combination module and outputs the positive sequence signal;

the second detection filter, wherein an input end of the second detection filter is connected to an output end of the third addition and subtraction combination module and outputs the negative sequence signal; and the third detection filter, wherein an input end of the third detection filter is connected to an output end of the fourth addition and subtraction combination module and outputs the sideband signal.

* * * * *